United States Patent Office 2,844,483
Patented July 22, 1958

2,844,483
PLASTICISERS

Frederick Ernest King, London, England, assignor to British Celanese Limited, a British company No Drawing. Application July 10, 1956
Serial No. 596,844

Claims priority, application Great Britain July 19, 1955

6 Claims. (Cl. 106—180)

This invention relates to plasticisers and especially to compositions containing a thermoplastic organic-substitution derivative of cellulose and a plasticiser therefor.

I have found that a valuable series of plasticisers can be obtained from tetramethylol cyclohexanols by suitable substitution of the hydrogen of the OH groups and especially by acylation with a lower fatty acid such as acetic acid.

The compositions of the present invention contain plasticisers of a new kind, viz. carboxylic acid esters of cyclohexanol derivatives containing a pair of methylol groups attached to an ortho carbon atom of the cyclohexanol ring. Preferably the cyclohexanol derivative contains a pair of methylol groups attached to each ortho carbon atom as in 2:2:6:6-tetramethylol cyclohexanol and its mono- and di-methyl nuclear substitution derivatives, and the carboxylic acid is a paraffinic monocarboxylic acid containing 2 to 4 carbon atoms. All the hydroxyl groups in the cyclohexanol derivative are preferably esterified with the carboxylic acid. Thus a useful plasticiser for cellulose acetate is the penta-acetate of 2:2:6:6-tetramethylol cyclohexanol.

The following example, wherein, as in all the examples herein, all the parts are by weight, describes one method for making the penta-acetate referred to.

Example 1

220 parts of 2:2:6:6-tetramethylol cyclohexanol and 560 parts of acetic anhydride were heated under reflux in a stream of hydrogen chloride for 6 hours. The current of hydrogen chloride was then cut off, and there was added 10 parts of pyridine. Acetyl chloride was then added to the reaction mixture in portions of 10 parts, while refluxing, until no more hydrogen chloride was evolved. The product was distilled first at atmospheric pressure, and then under 2 mm. pressure. The last fraction was re-distilled and the final product was collected at 218–224° C. under 2 mm. pressure. This was a pale green liquid highly viscous when cold, which had an acidity equivalent to 0.6 g. of acetic acid per 100 g. of product. In order to remove the acidity, the product was dissolved in ether, shaken with saturated sodium bicarbonate solution followed by refluxing the etherial solution. The solution was filtered, dried and the ether distilled off.

The removal of contaminating hydrochloric acid to a sufficient extent to obtain good heat stability in moulding compositions containing the plasticiser was found to be a troublesome operation when the plasticiser was made by this method, or by acetylating the cyclohexanol derivative by means of acetyl chloride. This operation can be avoided, at the expense of some reduction in the conversion obtained, by esterifying with the anhydride of the carboxylic acid in the absence of mineral acid, as in the following example.

Example 2

2:2:6:6-tetramethylol cyclohexanol was refluxed for 7 hours with a 10% excess of acetic anhydride. Acetic acid and residual acetic anhydride were then distilled off at atmospheric pressure. The pressure was then reduced to 2 mm. and the fraction distilling at 220–225° C. was collected. This was dissolved in ether. The pentaacetate crystallised out and after recrystallisation from ether was washed with water and dried.

The following examples illustrate the use of the penta-acetate as a plasticiser for cellulose acetate.

Example 3

A dope of the following composition was made:

100 parts of cellulose acetate of acetyl value (expressed as acetic acid) 52–54%,
30 parts of the penta-acetate obtained according to Example 1,
480 parts of acetone.

From this dope a 4-mil film was cast by the evaporative method.

This film had a tenacity of 651 kg./cm.$^2$, an elongation at break of 20%% and the toughness of a 10 cm. strip, determined by the Hounsfield method was 4272 kg./cm.$^2$.

The creep softening point was found to be 134.5° C. and the heat sealing temperature 170° C.

Example 4

A moulding composition consisting of 100 parts of cellulose acetate of the kind specified in Example 3, and 30 parts of the penta-acetate made according to Example 2 was compression-moulded into a disc at 200° C. the disc was strong and clear.

The penta-acetate of nuclear substituted 2:2:6:6-tetramethylol cyclohexanols also have valuable plasticising properties provided that the substituent group or groups be not unduly large and inactive.

The following example illustrates the preparation and use of the corresponding 4-methyl derivative.

Example 5

The penta-acetate of 2:2:6:6-tetramethylol-4-methyl cyclohexanol was made from the corresponding alcohol by the method of Example 2.

A moulding composition was made from 100 parts of cellulose acetate of the kind specified in Example 3, 10 parts of the penta-acetate and 20 parts of triacetin. From this composition a disc was moulded as described in Example 4. This was strong, clear and tough.

In a similar way, the penta-acetates of 2:2:6:6-tetramethylol-3:4-dimethyl cyclohexanol and 2:2:6:6-tetramethylol-3:5-dimethyl cyclohexanol can be made and utilised. Preferably the only substituent in the cyclohexanol derivative of which the plasticiser is an ester, apart from methylol, is methyl, and not more than two methyl groups are present in said derivative and it is of advantage, from the point of view of affinity for lower fatty acid esters of cellulose, for the cyclohexanol ring to be unsubstituted (apart from the methylol groups) or to contain only a single methyl substituent. With a paraffinic substituent other than methyl, e. g. ethyl, propyl, butyl, isopropyl or isobutyl, the affinity for cellulose acetate is much reduced, and the melting points of the esters are higher, so that their use with cellulose acetate is practicable only in the presence of a substantial excess of a liquid plasticiser of higher affinity. Such derivatives, however, and derivatives containing even longer paraffinic chains, are useful in connection with ethyl cellulose and higher fatty acid esters of cellulose.

The tetramethylol cyclohexanols (including nuclear substituted cyclohexanols of the kind referred to above) may be esterified with carboxylic acids other than acetic acid. Thus, for example, propionyl derivatives and especially mixed acetyl and propionyl derivatives of these alcohols, having valuable plasticising properties can be obtained. The esterifying acid or part thereof may be a dicarboxylic acid, e. g. oxalic acid or maleic acid, so that the products contain cyclic ester groups. Useful plasticisers can also be obtained by suitable etherification of the hydroxy groups of the tetramethylol cyclohexanols. Complete etherification with a paraffinic alcohol gives products having little affinity for cellulose acetate, but products compatible with this material can be obtained by etherification of part of the hydroxy content by means of methyl alcohol, and acylation (preferably acetylation) of the remainder, or by acetalisation of one pair of methylol groups by means of formaldehyde and acylation (preferably acetylation) of the remaining hydroxy groups.

The plasticising properties of the cyclohexanol derivative referred to above appear to be due in some measure to the two side chains, or the corresponding ring in the case of the formals and cyclic esters, originating on the 2:6-carbon atoms of the cyclohexane ring. Similar substitution products of other polymethylol cyclohexanols having at least one pair of methylol groups attached to a nuclear carbon atom can be prepared and used in a similar way to the substances referred to above. Among such substitution products may be mentioned the triacetate of 2-methyl-6:6-dimethylol cyclohexanol and the corresponding 4-methyl derivative. These may be made by the method of Examples 1 or 2 and employed as in Examples 3, 4 or 5.

The plasticisers of the invention are of special value in making films (including foils) of high tenacity and low extension. These plasticisers may also be used in making other kinds of cellulose acetate product, for example, in making sheets by the block process, in making moulding compositions, and in formulating cellulose acetate lacquers for use as protective coatings. The introduction of the plasticiser into the cellulose acetate composition can be carried out by various methods. Thus, for example, in making a moulding or extrusion composition the plasticiser and cellulose acetate may be mixed with a volatile solvent for both, to form a solution from which the volatile solvent is then evaporated, or the plasticiser and cellulose acetate may be dissolved in a hot liquid which is not a solvent at ordinary temperature, for example, ethanol, the solution being then cooled until precipitation occurs, after which the volatile liquid is evaporated, or hot mixing or milling methods, avoiding the use of volatile liquids, may be adopted.

The proportion of the plasticisers that may be present in a cellulose acetate composition may range from below 20%, for example 8–10%, to 30% or more, for example 50%, these percentages being based on the weight of the cellulose acetate, according to the affinity of the particular plasticiser for cellulose acetate, its melting point and whether a more active liquid plasticiser is also present. Thus, for example, should a higher degree of softness than is imparted by the methylol cyclohexanol derivative be desired, it may be used in admixture with a mobile plasticiser of high solvent power such, for example, as dimethyl phthalate or triacetin, and when improved fire-resistance is called for a proportion of a phosphate plasticiser, for example, triphenyl phosphate, tricresyl phosphate or trichlorethyl phosphate, may be incorporated.

The invention has been described with particular reference to the use of the methylol cyclohexanol derivatives as plasticisers for cellulose acetate of acetyl value 52–54%. They can also be used, however, as softeners, or plasticisers for cellulose acetates of higher acetyl value e. g. 54 to 56% or 58 to 62.5% and for other cellulose derivatives, e. g. cellulose nitrate, cellulose ethers such as ethyl cellulose and benzyl cellulose, and especially other cellulose esters derived from fatty acids containing up to 4 carbon atoms, for example, cellulose propionate, cellulose acetate propionate, cellulose acetate butyrate and cellulose butyrate.

Having described my invention, what I desire to secure by Letters Patent is:

1. A composition having a basis of cellulose acetate plasticised with the aid of an ester selected from the class consisting of the pentaacetate of 2:2:6:6-tetramethylol cyclohexanol and nuclear monomethyl substitution derivatives thereof.

2. A composition having a basis of cellulose acetate of acetyl value (expressed as acetic acid) 52 to 56%, plasticised with the aid of 10 to 55%, based on the weight of the cellulose acetate, of the pentaacetate of 2:2:6:6-tetramethylol cyclohexanol.

3. A composition having a basis of cellulose acetate of acetyl value (expressed as acetic acid) 52 to 56%, plasticised with the aid of 10 to 55%, based on the weight of the cellulose acetate, of the pentaacetate of 2:2:6:6-tetramethylol-4-methyl cyclohexanol.

4. A composition according to claim 2, wherein the acetyl value of the cellulose acetate (expressed as acetic acid) is 52 to 54%.

5. A composition according to claim 3, wherein the acetyl value of the cellulose acetate (expressed as acetic acid) is 52 to 54%.

6. A film formed of the composition claimed in the claim 4.

References Cited in the file of this patent

UNITED STATES PATENTS

| | | |
|---|---|---|
| 1,548,932 | Clarke | Aug. 11, 1925 |
| 2,480,348 | Wittcoff | Aug. 30, 1949 |